(12) United States Patent
Kumar et al.

(10) Patent No.: US 10,367,541 B2
(45) Date of Patent: Jul. 30, 2019

(54) MECHANISM TO MITIGATE TRANSMITTER AND RECEIVER VOLTAGE-CONTROLLED OSCILLATOR (VCO) PULLING

(71) Applicant: QUALCOMM Incorporated, San Diego, CA (US)

(72) Inventors: Akash Kumar, Hyderabad (IN); Rimal Patel, Hyderabad (IN); Raveesh Juneja, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 15/493,996

(22) Filed: Apr. 21, 2017

(65) Prior Publication Data
US 2018/0309472 A1     Oct. 25, 2018

(51) Int. Cl.
| | |
|---|---|
| *H04B 1/408* | (2015.01) |
| *H04W 88/06* | (2009.01) |
| *H04W 88/10* | (2009.01) |
| *H04W 84/04* | (2009.01) |
| *H04L 5/14* | (2006.01) |
| *H04B 1/00* | (2006.01) |
| *H04B 1/525* | (2015.01) |

(52) U.S. Cl.
CPC .............. *H04B 1/408* (2013.01); *H04B 1/005* (2013.01); *H04B 1/525* (2013.01); *H04L 5/14* (2013.01); *H04W 84/042* (2013.01); *H04W 88/06* (2013.01); *H04W 88/10* (2013.01)

(58) Field of Classification Search
None
See application file for complete search history.

(56) References Cited

U.S. PATENT DOCUMENTS

| | | | |
|---|---|---|---|
| 9,100,108 B2 | 8/2015 | Prajapati et al. | |
| 9,143,085 B2 | 9/2015 | Narathong et al. | |
| 2006/0116085 A1 | 6/2006 | Borremans et al. | |
| 2010/0027517 A1 | 2/2010 | Bonta et al. | |
| 2014/0072001 A1* | 3/2014 | Chang ................. | H04B 1/0064 370/542 |
| 2014/0187284 A1* | 7/2014 | Sanchez ............... | H04B 7/0814 455/550.1 |
| 2014/0362824 A1 | 12/2014 | Rousu et al. | |
| 2015/0092683 A1 | 4/2015 | Rangarajan et al. | |

(Continued)

OTHER PUBLICATIONS

International Search Report and Written Opinion—PCT/US2018/027590—ISA/EPO—dated Jul. 11, 2018.

*Primary Examiner* — Saumit Shah
(74) *Attorney, Agent, or Firm* — Patterson & Sheridan, L.L.P.

(57) ABSTRACT

Certain aspects of the present disclosure provide methods and apparatus for wireless communication. One example apparatus generally includes a first transceiver configured to transmit and receive signals in a first frequency band and a second transceiver configured to transmit and receive signals in a second frequency band. The apparatus may also include a processing system coupled to the first transceiver and the second transceiver. The processing system may be configured to dynamically assign transmission operations or reception operations of a signal in the first frequency band to the second transceiver.

30 Claims, 6 Drawing Sheets

(56) References Cited

U.S. PATENT DOCUMENTS

2015/0139015 A1\* 5/2015 Kadous ................ H04W 24/08
 370/252
2015/0334710 A1 11/2015 Tang et al.
2015/0349907 A1\* 12/2015 Narathong ................ H04J 4/00
 370/280

\* cited by examiner

US 10,367,541 B2

MECHANISM TO MITIGATE TRANSMITTER AND RECEIVER VOLTAGE-CONTROLLED OSCILLATOR (VCO) PULLING

TECHNICAL FIELD

Certain aspects of the present disclosure generally relate to wireless communications and, more particularly, to communication using carrier aggregation.

BACKGROUND

Wireless communication networks are widely deployed to provide various communication services such as telephony, video, data, messaging, broadcasts, and so on. Such networks, which are usually multiple access networks, support communications for multiple users by sharing the available network resources. For example, one network may be a 3G (the third generation of mobile phone standards and technology) system, which may provide network service via any one of various 3G radio access technologies (RATs) including EVDO (Evolution-Data Optimized), 1×RTT (1 times Radio Transmission Technology, or simply 1×), W-CDMA (Wideband Code Division Multiple Access), UMTS-TDD (Universal Mobile Telecommunications System—Time Division Duplexing), HSPA (High Speed Packet Access), GPRS (General Packet Radio Service), or EDGE (Enhanced Data rates for Global Evolution). The 3G network is a wide area cellular telephone network that evolved to incorporate high-speed internet access and video telephony, in addition to voice calls. Furthermore, a 3G network may be more established and provide larger coverage areas than other network systems. Such multiple access networks may also include code division multiple access (CDMA) systems, time division multiple access (TDMA) systems, frequency division multiple access (FDMA) systems, orthogonal frequency division multiple access (OFDMA) systems, single-carrier FDMA (SC-FDMA) networks, 3rd Generation Partnership Project (3GPP) Long Term Evolution (LTE) networks, and Long Term Evolution Advanced (LTE-A) networks.

A wireless communication network may include a number of base stations that can support communication for a number of mobile stations. A mobile station (MS) may communicate with a base station (BS) via a downlink and an uplink. The downlink (or forward link) refers to the communication link from the base station to the mobile station, and the uplink (or reverse link) refers to the communication link from the mobile station to the base station. A BS may transmit data and control information on the downlink to a mobile station and/or may receive data and control information on the uplink from the mobile station. The BS and/or the MS may include at least two VCOs used for transmission and reception operations. In some cases, where the frequencies of the VCOs are the same (or close to the same), the VCOs may experience VCO pulling issues.

SUMMARY

Certain aspects of the present disclosure generally relate to dynamically assigning transmission operations or reception operations from one transceiver to another.

Certain aspects of the present disclosure provide an apparatus for wireless communication, in accordance with certain aspects of the present disclosure. The apparatus generally includes a first transceiver configured to transmit and receive signals in a first frequency band, a second transceiver configured to transmit and receive signals in a second frequency band, and a processing system coupled to the first transceiver and the second transceiver and configured to dynamically assign transmission operations or reception operations of a signal in the first frequency band to the second transceiver.

Certain aspects of the present disclosure provide a method for wireless communication, in accordance with certain aspects of the present disclosure. The method generally includes determining whether transmission operations and reception operations of a first transceiver chip are time-division duplexed (TDD), the first transceiver chip being configured to transmit and receive signals in a first frequency band, and dynamically assigning transmission operations or reception operations of a signal in the first frequency band to a second transceiver chip based on the determination, the second transceiver chip being configured to transmit and receive signals in a second frequency band.

Certain aspects of the present disclosure provide an apparatus for wireless communication, in accordance with certain aspects of the present disclosure. The apparatus generally includes means for transmitting and receiving signals in a first frequency band, means for transmitting and receiving signals in a second frequency band, and means for dynamically assigning transmission operations or reception operations of a signal in the first frequency band to the means for transmitting and receiving signals in the second frequency band.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the present disclosure are described below. It should be apparent that the teachings herein may be embodied in a wide variety of forms and that any specific structure, function, or both being disclosed herein is merely representative. Based on the teachings herein, one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects.

The techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), Single Carrier Frequency Division Multiple Access (SC-FDMA), Time Division Synchronous Code Division Multiple Access (TD-SCDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement Institute of Electrical and Electronics Engineers (IEEE) 802.11, IEEE 802.16, Long Term Evolution (LTE) (e.g., in TDD and/or FDD modes), or some other standards. A TDMA system may implement Global System for Mobile Communications (GSM) or some other standards. These various standards are known in the art.

An Example Wireless System

Figure 1:
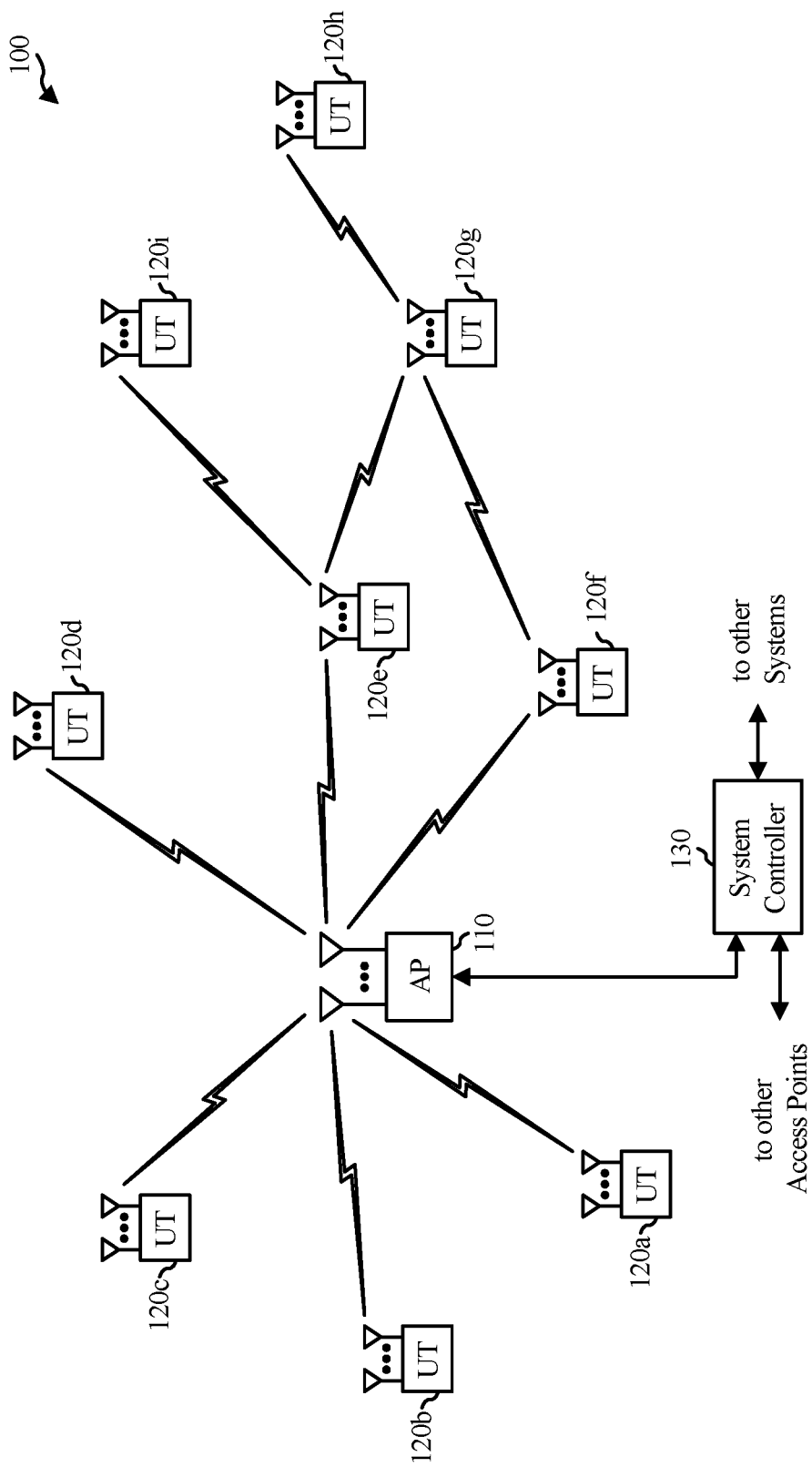
FIG. 1 is a diagram of an example wireless communications network in accordance with certain aspects of the present disclosure.

FIG. 1 illustrates a wireless communications system 100 with access points and user terminals. For simplicity, only one access point 110 is shown in FIG. 1. An access point (AP) is generally a fixed station that communicates with the user terminals and may also be referred to as a base station (BS), an evolved Node B (eNB), or some other terminology. A user terminal (UT) may be fixed or mobile and may also be referred to as a mobile station (MS), an access terminal, user equipment (UE), a station (STA), a client, a wireless device, or some other terminology. A user terminal may be a wireless device, such as a cellular phone, a personal digital assistant (PDA), a handheld device, a wireless modem, a laptop computer, a tablet, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 may be equipped with a number $N_{ap}$ of antennas to achieve transmit diversity for downlink transmissions and/or receive diversity for uplink transmissions. A set $N_u$ of selected user terminals 120 may receive downlink transmissions and transmit uplink transmissions. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

Wireless system 100 may be a time division duplex (TDD) system or a frequency division duplex (FDD) system. For a TDD system, the downlink and uplink share the same frequency band. For an FDD system, the downlink and uplink use different frequency bands. System 100 may also utilize a single carrier or multiple carriers for transmission. Each user terminal may be equipped with a single antenna (e.g., in order to keep costs down) or multiple antennas (e.g., where the additional cost can be supported).

In certain aspects, the AP 110 and/or UT 120 may include a controller configured to control multiple transceiver chips. Each of the transceiver chips may be configured to transmit and receive signals in different frequency bands. In certain aspects of the present disclosure, the controller may dynamically assign the transmission or reception operations of one of the transceiver chips to another to avoid, or at least reduce, voltage-controlled oscillator (VCO) pulling issues.

Figure 2:
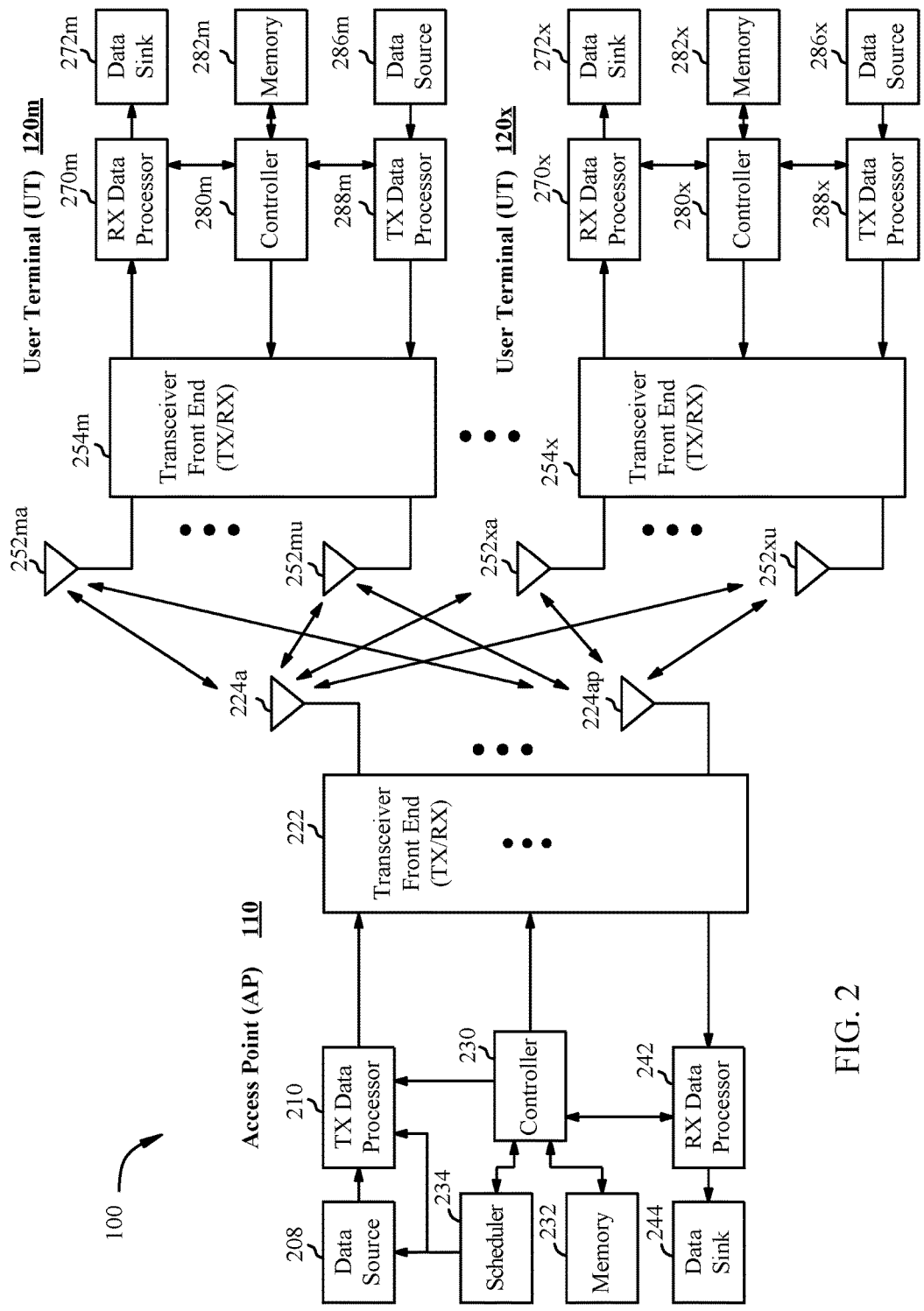
FIG. 2 is a block diagram of an example access point (AP) and example user terminals in accordance with certain aspects of the present disclosure.

FIG. 2 shows a block diagram of access point 110 and two user terminals 120*m* and 120*x* in wireless system 100. Access point 110 is equipped with $N_{ap}$ antennas 224*a* through 224*ap*. User terminal 120*m* is equipped with $N_{ut,m}$ antennas 252*ma* through 252*mu*, and user terminal 120*x* is equipped with $N_{ut,x}$ antennas 252*xa* through 252*xu*. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. Beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up}\}$ for the user terminal based on the coding and modulation schemes associated with the rate selected for the user terminal and provides a data symbol stream $\{s_{up}\}$ for one of the $N_{ut,m}$ antennas. A transceiver front end (TX/RX) 254 (also known as a radio frequency front end (RFFE)) receives and processes (e.g., converts to analog, amplifies, filters, and frequency upconverts) a respective symbol stream to generate an uplink signal. The transceiver front end 254 may also route the uplink signal to one of the $N_{ut,m}$ antennas for transmit diversity via an RF switch, for example. The controller 280 may control the routing within the transceiver front end 254. Memory 282 may store data and program codes for the user terminal 120 and may interface with the controller 280.

A number $N_{up}$ of user terminals may be scheduled for simultaneous transmission on the uplink. Each of these user terminals transmits its set of processed symbol streams on the uplink to the access point.

At access point 110, $N_{ap}$ antennas 224a through 224ap receive the uplink signals from all $N_{up}$ user terminals transmitting on the uplink. For receive diversity, a transceiver front end 222 may select signals received from one of the antennas 224 for processing. For certain aspects of the present disclosure, a combination of the signals received from multiple antennas 224 may be combined for enhanced receive diversity. The access point's transceiver front end 222 also performs processing complementary to that performed by the user terminal's transceiver front end 254 and provides a recovered uplink data symbol stream. The recovered uplink data symbol stream is an estimate of a data symbol stream $\{s_{up}\}$ transmitted by a user terminal. An RX data processor 242 processes (e.g., demodulates, deinterleaves, and decodes) the recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 may provide a downlink data symbol streams for one of more of the $N_{dn}$ user terminals to be transmitted from one of the $N_{ap}$ antennas. The transceiver front end 222 receives and processes (e.g., converts to analog, amplifies, filters, and frequency upconverts) the symbol stream to generate a downlink signal. The transceiver front end 222 may also route the downlink signal to one or more of the $N_{ap}$ antennas 224 for transmit diversity via an RF switch, for example. The controller 230 may control the routing within the transceiver front end 222. Memory 232 may store data and program codes for the access point 110 and may interface with the controller 230.

At each user terminal 120, $N_{ut,m}$ antennas 252 receive the downlink signals from access point 110. For receive diversity at the user terminal 120, the transceiver front end 254 may select signals received from one of the antennas 252 for processing. For certain aspects of the present disclosure, a combination of the signals received from multiple antennas 252 may be combined for enhanced receive diversity. The user terminal's transceiver front end 254 also performs processing complementary to that performed by the access point's transceiver front end 222 and provides a recovered downlink data symbol stream. An RX data processor 270 processes (e.g., demodulates, deinterleaves, and decodes) the recovered downlink data symbol stream to obtain decoded data for the user terminal.

In certain aspects, the transceiver front end 222 and/or 254 may be implemented using multiple transceiver chips and the controller 230 or 280 may be configured to control multiple transceiver chips. Each of the transceiver chips may be configured to transmit and receive signals in different frequency bands. In certain aspects of the present disclosure, the controller 230 or 280 may dynamically assign the transmission or reception operations of one of the transceiver chips to another to avoid, or at least reduce, VCO pulling issues.

Those skilled in the art will recognize the techniques described herein may be generally applied in systems utilizing any type of multiple access schemes, such as TDMA, SDMA, Orthogonal Frequency Division Multiple Access (OFDMA), CDMA, SC-FDMA, TD-SCDMA, and combinations thereof.

Figure 3:
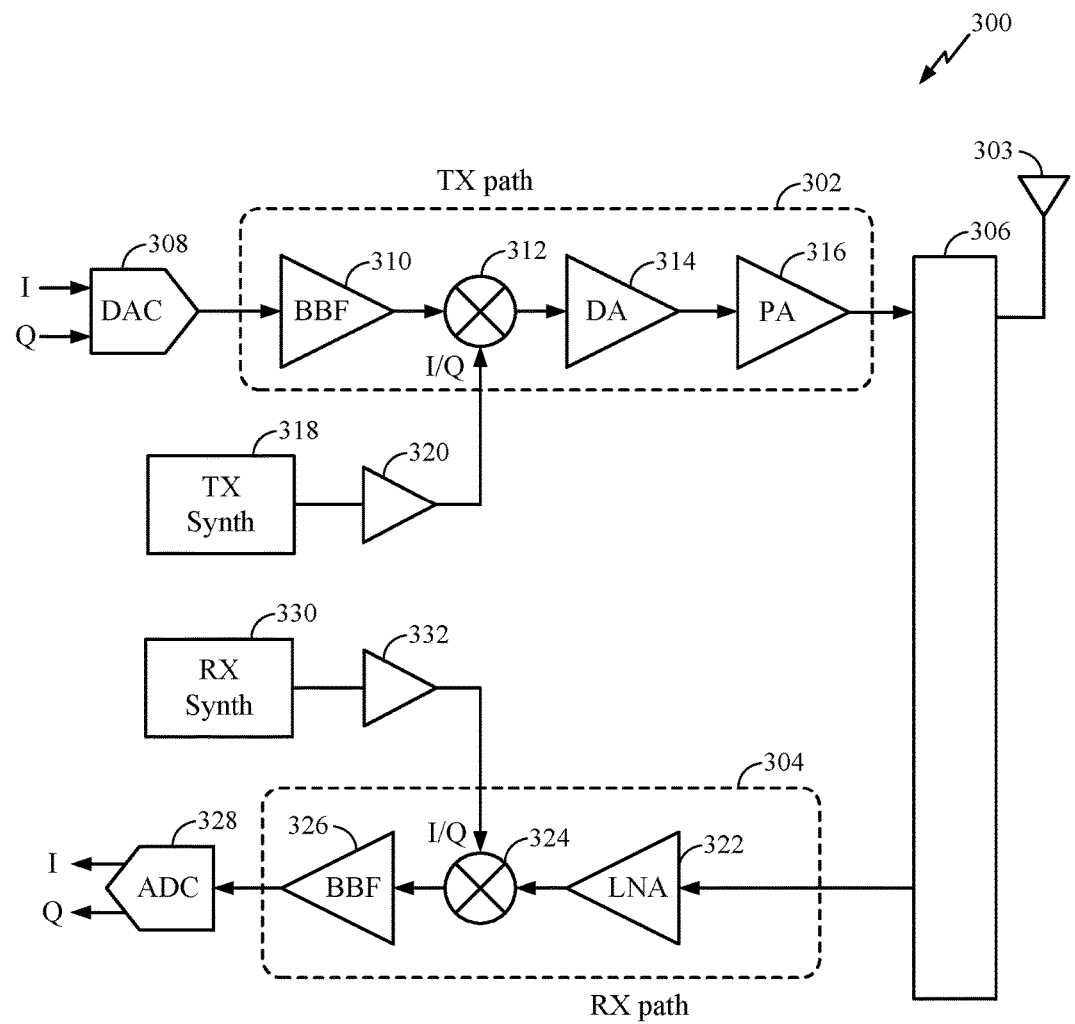
FIG. 3 is a block diagram of an example transceiver front end in accordance with certain aspects of the present disclosure.

FIG. 3 is a block diagram of an example transceiver front end 300, such as transceiver front ends 222, 254 in FIG. 2, in accordance with certain aspects of the present disclosure. The transceiver front end 300 includes a transmit (TX) path 302 (also known as a transmit chain) for transmitting signals via one or more antennas and a receive (RX) path 304 (also known as a receive chain) for receiving signals via the antennas. When the TX path 302 and the RX path 304 share an antenna 303, the paths may be connected with the antenna via an interface 306, which may include any of various suitable RF devices, such as a duplexer, a switch, a diplexer, and the like.

Receiving in-phase (I) or quadrature (Q) baseband analog signals from a digital-to-analog converter (DAC) 308, the TX path 302 may include a baseband filter (BBF) 310, a mixer 312, a driver amplifier (DA) 314, and a power amplifier 316. The BBF 310, the mixer 312, and the DA 314 may be included in a radio frequency integrated circuit (RFIC), while the PA 316 is often external to the RFIC. The BBF 310 filters the baseband signals received from the DAC 308, and the mixer 312 mixes the filtered baseband signals with a transmit local oscillator (LO) signal to convert the baseband signal of interest to a different frequency (e.g., upconvert from baseband to RF). This frequency conversion process produces the sum and difference frequencies of the LO frequency and the frequency of the signal of interest. The sum and difference frequencies are referred to as the beat frequencies. The beat frequencies are typically in the RF range, such that the signals output by the mixer 312 are typically RF signals, which are amplified by the DA 314 and by the PA 316 before transmission by the antenna 303.

The RX path 304 includes a low noise amplifier (LNA) 322, a mixer 324, and a baseband filter (BBF) 326. The LNA 322, the mixer 324, and the BBF 326 may be included in a radio frequency integrated circuit (RFIC), which may or may not be the same RFIC that includes the TX path components. RF signals received via the antenna 303 may be amplified by the LNA 322, and the mixer 324 mixes the amplified RF signals with a receive local oscillator (LO) signal to convert the RF signal of interest to a different baseband frequency (i.e., downconvert). The baseband signals output by the mixer 324 may be filtered by the BBF 326 before being converted by an analog-to-digital converter (ADC) 328 to digital I or Q signals for digital signal processing.

While it is desirable for the output of an LO to remain stable in frequency, tuning to different frequencies indicates using a variable-frequency oscillator, which involves compromises between stability and tunability. Contemporary systems employ frequency synthesizers with a voltage-controlled oscillator (VCO) to generate a stable, tunable LO with a particular tuning range. Thus, the transmit LO is typically produced by a TX frequency synthesizer 318, which may be buffered or amplified by amplifier 320 before being mixed with the baseband signals in the mixer 312. Similarly, the receive LO is typically produced by an RX frequency synthesizer 330, which may be buffered or amplified by amplifier 332 before being mixed with the RF signals in the mixer 324.

In certain aspects, the reception and transmission operations of the example transceiver front end 300 of FIG. 3 may be implemented in TDD mode. In other words, the TX path 302 and the RX path 304 may be configured to transmit and receive, respectively, signals in the same (or close to the same) frequency. In this case, VCO pulling issues may be experienced between a VCO of the TX synthesizer 318 and a VCO of the RX synthesizer 330. In this case, a controller (e.g., controller 230 or 280) may be used to dynamically assign the transmission or reception operations of the transceiver front end 300 to another transceiver chip, and vice versa. For example, the controller may adjust a tuning frequency of the VCO of the TX synthesizer 318 such that signals transmitted using the TX path 302 are in a frequency band corresponding to the transmission operations of the other transceiver chip.

Example Technique to Mitigate Transmitter and Receiver VCO Pulling

Carrier aggregation (CA) is used in some radio access technologies (RATs), such as LTE-A, in an effort to increase the bandwidth, and thereby increase bitrates. In carrier aggregation, multiple frequency resources or bands (i.e., carriers) are allocated for sending data. Each aggregated carrier is referred to as a component carrier (CC). In LTE Rel-10, for example, up to five CCs can be aggregated, allowing an aggregated frequency bandwidth of 100 MHz. The allocation of resources may be contiguous or non-contiguous.

A carrier aggregation transceiver may be implemented as a single integrated circuit (IC) (i.e., a single chip). Issues with VCO pulling are aggravated when multiple PLLs/frequency oscillators are implemented on the same chip and are tuned to the same (or close to the same) frequency. The problem of VCO pulling is evident in LTE-time divisional duplexing (TDD) mode of operation because in TDD mode, the receiver (Rx) and the transmitter (Tx) operate on the same frequency, but are separated in the time domain. Thus, the Rx and Tx VCOs may be tuned to the same frequency, causing VCO pulling issues. The problem with VCO pulling may be less prevalent with frequency divisional duplexing (FDD) because for FDD, the Rx and Tx may be operated on sufficiently spaced apart frequencies. The problem with VCO pulling may be even more aggravated and evident with TDD deployment with multiple TDD carriers in case of carrier aggregation with multiple component carriers of TDD type. VCO pulling issues may cause phase noise degradation, in-band spurs, and frequency drift, as well as receiver sensitivity degradation, increased BLER in uplink (UL) and downlink (DL) and throughput degradation.

Certain aspects of the present disclosure provide a mechanism to address VCO pulling with multiple CCs. For example, the CCs may be on TDD bands and suffering from Tx and Rx VCO pulling issues. Aspects of the present disclosure provide an intelligent receive and transmit chain mapping on multiple different transceiver so that the TDD system is effectively converted to an FDD system from a transceiver point of view with Rx VCO and Tx VCO tuned to different frequencies on the same transceiver. In other words, certain aspects of the present disclosure reduce the effects of VCO pulling through dynamic transmit or receive chain hopping from one transceiver to another transceiver such that, on the same transceiver, the receive and transmit VCOs are tuned to two different frequencies. The transceivers may reside within a same chip or within their respective separate chips.

Consider a case wherein a carrier (B39) on a first transceiver chip and a carrier (B40) on a second transceiver chip are aggregated. In this case, both Rx VCO and Tx VCO on a transceiver chip may be tuned to the same frequency in TDD mode. Similarly, Tx VCO and Rx VCO of a second transceiver chip may be tuned to the same frequency in TDD mode, resulting in VCO pulling on both the first and second transceiver chips. In certain aspects, the first transceiver chip may transmit and receive primary component carriers (PCCs), and the second transceiver chip may transmit and receive secondary component carriers (SCCs). Thus, the Rx and Tx VCO pulling issues of each transceiver chip can result in throughput degradation on both PCCs and SCCs.

In certain aspects of the present disclosure, the transmit operations of the first transceiver chip may be assigned (e.g., hopped) to the second transceiver chip, and the transmit operations of the second transceiver chip may be assigned to the first transceiver chip. Thus, each of the first and second transceiver chips have a Rx VCO and a Tx VCO tuned to different frequencies. Therefore, from the perspective of the first and second transceiver chips, each transceiver is effectively operating in FDD mode with the Rx and Tx operating frequencies spaced apart, reducing VCO pulling issues. Accordingly, certain aspects of the present disclosure address VCO pulling on both transceiver chips intelligently which may require no additional hardware circuitry or little to no additional software complexity.

Figure 4:
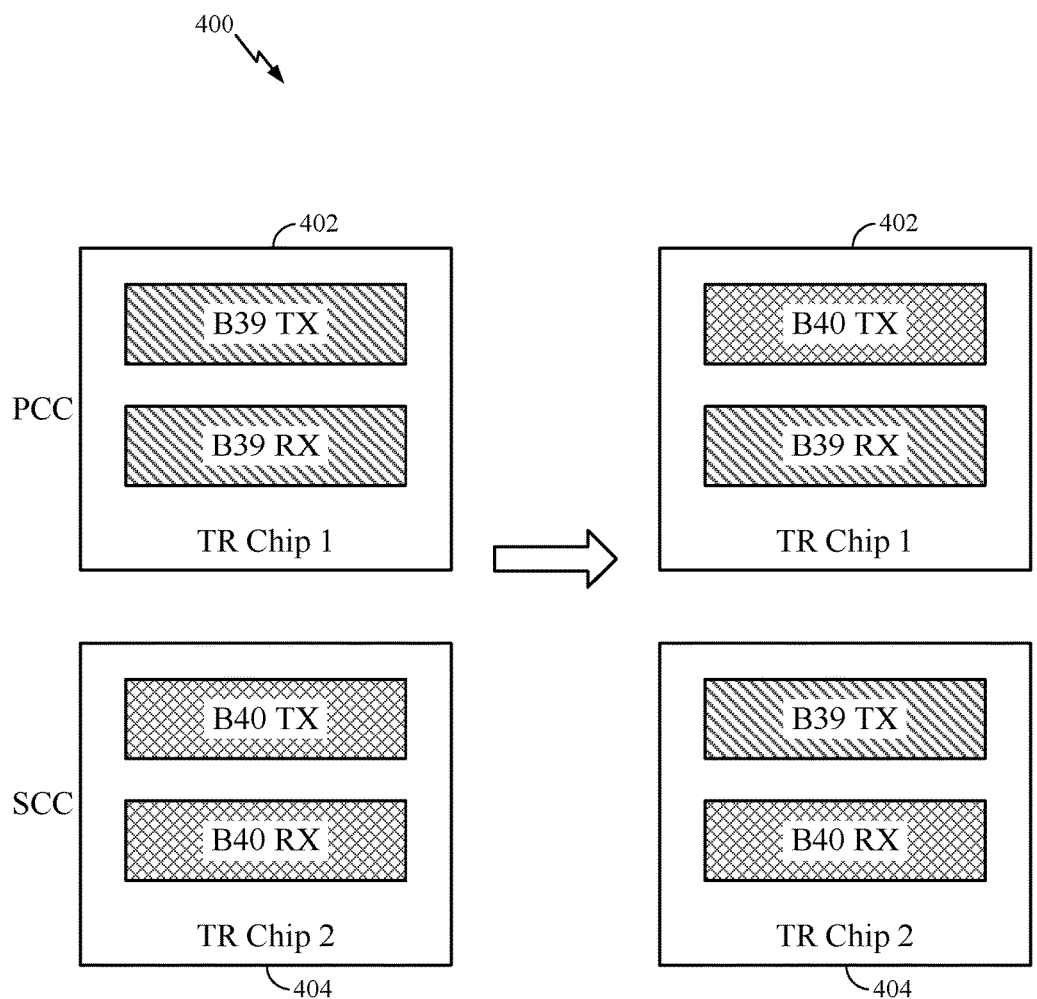
FIG. 4 illustrates a communication system with assignment of transmit and receive operations to multiple transceiver chips, in accordance with certain aspects of the present disclosure.

FIG. 4 illustrates a communication system 400 with assignment of transmit and receive operations to multiple transceiver chips, in accordance with certain aspects of the present disclosure. As illustrated, the transceiver chip 402 may be configured to transmit and receive a PCC B39, and the transceiver chip 404 may be configured to transmit and receive a SCC B40. In certain aspects, at least one of the transceiver chip 402 or the transceiver chip 404 may be configured in TDD mode. Thus, the transmit operations and receive operations of the PCC B39 and/or SCC B40 may on the same (or close to the same) frequency.

The Tx VCO used to transmit PCC B39 (and/or the Tx VCO used to transmit SCC B40) and the Rx VCO used to receive PCC B39 (and/or the Rx VCO used to receive SCC B40) may experience VCO pulling issues. In this case, the assignment for transmission or reception of the PCCs B39 (or SCCs B40) may be reconfigured to avoid VCO pulling issues. For example, the transmit operations of SCC B40 on the transceiver chip 404 may be assigned (or reassigned) to transceiver chip 402, and the transmit operations of PCC B39 of transceiver chip 402 may be assigned (or reassigned) to transceiver chip 404. Thus, each of the transceiver chips 402 and 404 may avoid (or at least reduce) VCO pulling issues since the transmit and receive operations are separated in the frequency domain with the respective transceiver chip.

While the example provided in FIG. 4 is described with a single SCC to facilitate understanding, the techniques provided herein can be applied to any number of SCCs and corresponding transceiver chips. For example, in certain aspects, transmit and receive operations of another SCC may be implemented on a third transceiver chip (not shown) which may be implemented in TDD mode. In this case, the transmit operations of PCC B39 may be assigned to the transceiver chip 404, the transmit operations of SCC B40 may be assigned to the third transceiver chip, and the transmit operations of the SCC on the third transceiver chip may be assigned to the transceiver chip 402. Moreover, rather than reassigning (or hopping) transmit operations of one transceiver chip to another, receive operations may be reassigned instead.

In certain aspects, assigning (or reassigning) the transmission operations or the reception operations of transceiver chips as described herein may involve adjusting a frequency of respective VCOs of the transceiver chips. For example, in the reconfiguration scenario of FIG. 4, a controller (e.g., controller 230) may adjust the tuning frequency of the Tx VCO of transceiver chip 402 to generate signals for transmission in the frequency band associated with the SCC B40. In other words, the Tx VCO of transceiver chip 402 may be configured to generate a local oscillator (LO) signal at a frequency such that a baseband (or intermediate frequency (IF)) signal is upconverted to the frequency band associated with the SCC B40 for transmission. Similarly, the controller may adjust the tuning frequency of the Tx VCO of transceiver chip 404 to generate signals for transmission in the frequency band associated with the PCC B39. In certain aspects, the controller (e.g., controller 230) may reassign the transmission or reception operations of a transceiver chip (e.g., transceiver chip 402), as described herein, in response to a determination that the transceiver chip is implemented in TDD mode.

Figure 5:
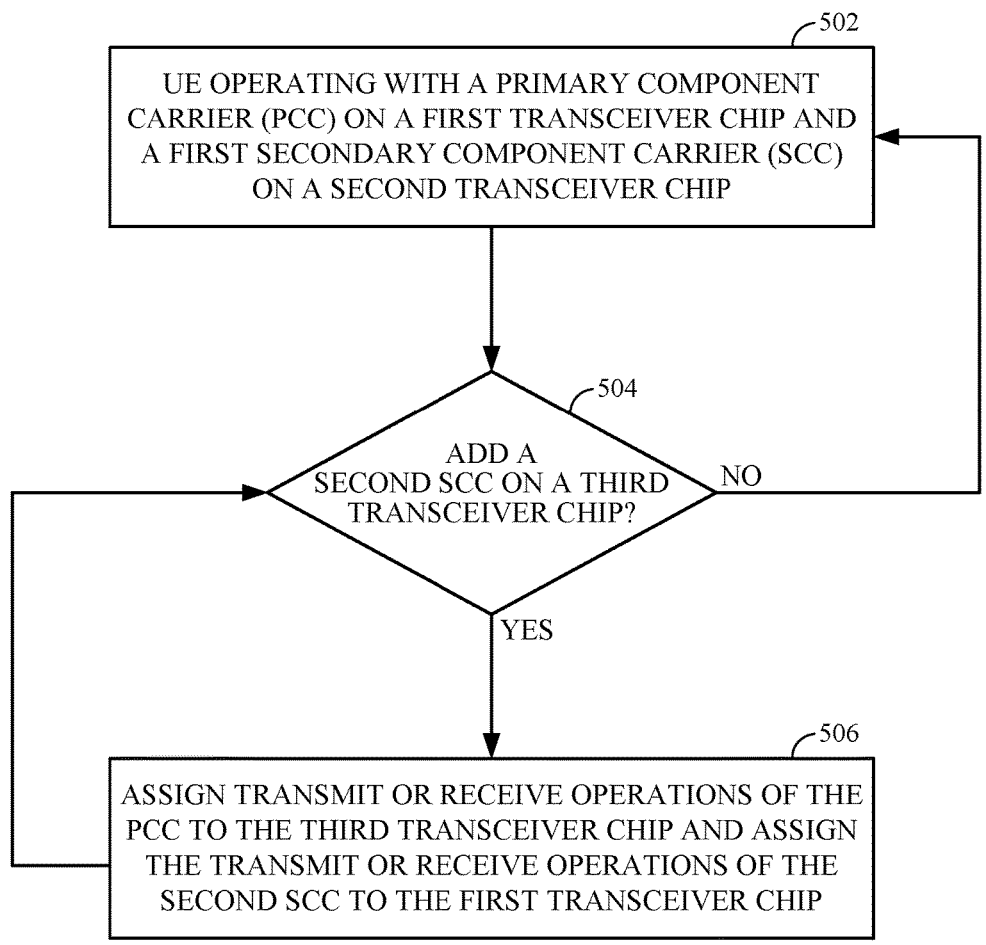
FIG. 5 illustrates example operations for assigning transmission and receptions operations, in accordance with certain aspects of the present disclosure.

FIG. 5 illustrates example operations 500 for assigning transmission and receptions operations, in accordance with certain aspects of the present disclosure. The operations 500 may be performed by a processing system (e.g., the controller 230) in an apparatus (e.g., a user terminal).

The operations 500 may begin, at block 502, with the apparatus operating with a PCC on a first transceiver chip (e.g., transceiver chip 402) and a first SCC on a second transceiver chip (e.g., transceiver chip 404). At block 504, the processing system may determine whether to add a second SCC on a third transceiver chip. If so, the processing system may assign, at block 506, transmission (or reception) operations of the PCC to the third transceiver chip and assign transmission (or reception) operations of the second SCC to the first transceiver chip. In certain aspects, the processing system may also determine whether the transmission operations and/or reception operations of the second SCC on the third transceiver chip are TDD prior to the assignment at block 506.

Figure 6:
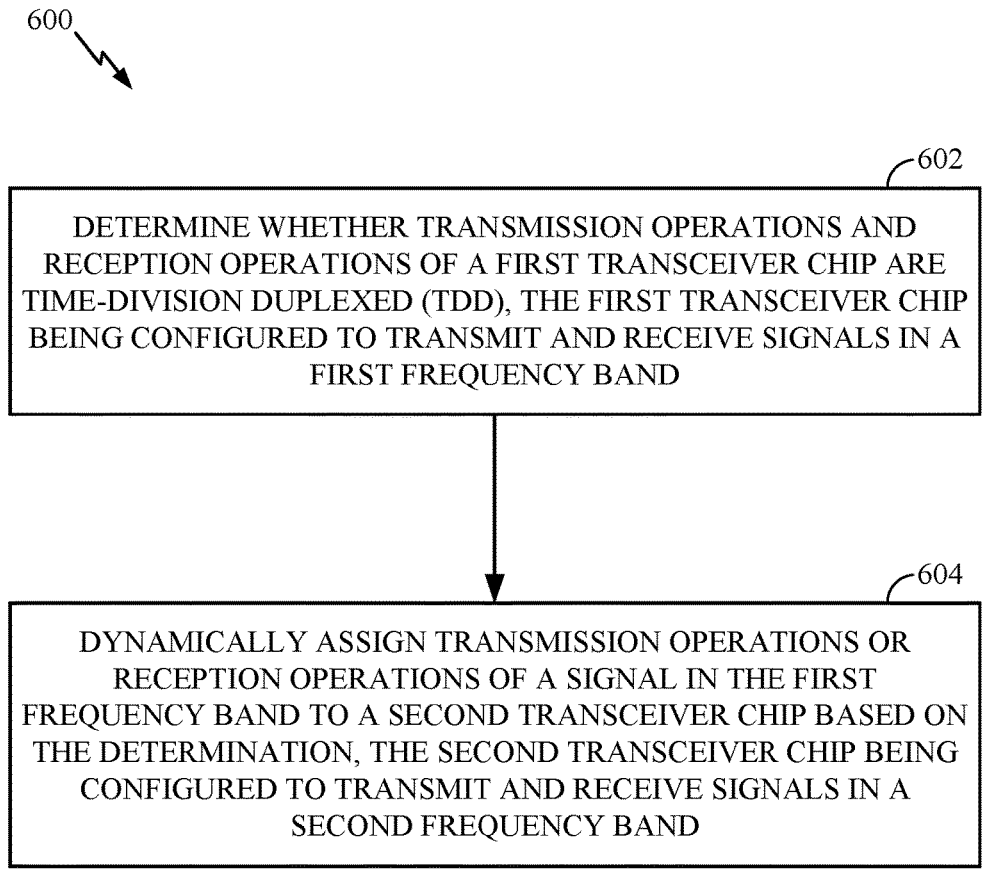
FIG. 6 is a flow diagram of example operations for wireless communication, in accordance with certain aspects of the present disclosure.

FIG. 6 is a flow diagram of example operations 600 for wireless communication, in accordance with certain aspects of the present disclosure. The operations 600 may be performed, for example, by a controller (e.g., the controller 230 of FIG. 2) and transceiver front end circuitry, such as transceiver front end 222, transceiver chip 402 and/or transceiver chip 404 of FIG. 4.

The operations 600 may begin, at block 602, by determining whether transmission operations and reception operations of a first transceiver chip (e.g., transceiver chip 402) are time-division duplexed (TDD), the first transceiver chip being configured to transmit and receive signals in a first frequency band (e.g., corresponding to PCC). At block 604, the operations 600 continue by dynamically assigning transmission operations or reception operations of a signal in the first frequency band to a second transceiver chip (e.g., transceiver chip 404) based on the determination, the second transceiver chip being configured to transmit and receive signals in a second frequency band (e.g., corresponding to SCC).

In certain aspects, dynamically assigning the transmission operations or the reception operations at block 604 may involve adjusting a frequency of a VCO used to upconvert another signal (e.g., a baseband signal or IF signal) to generate the signal in the first frequency band for transmission or downconvert the signal in the first frequency band for reception, respectively. In certain aspects, the second transceiver chip may include a VCO. In this case, the operations 600 may also include, after the dynamic assignment at block 604, configuring the VCO to provide an LO signal for upconverting another signal (e.g., a baseband signal or IF signal) to generate the signal in the first frequency band for transmission, or downconverting the signal in the first frequency band for reception.

In certain aspects, the dynamically assigning at block 604 comprises assigning the transmission operations of the signal in the first frequency band to the second transceiver chip, and assigning transmission operations of a signal in the second frequency band to the first transceiver chip. In certain aspects, the dynamically assigning at block 604 comprises assigning transmission operations or reception operations of a signal in the second frequency band to a third transceiver chip. In this case, the dynamically assigning at block 604 may involve assigning the transmission operations of the signal in the first frequency band to the second transceiver chip, assigning the transmission operations of the signal in the second frequency band to the third transceiver chip, and assigning transmission operations of a signal in a third frequency band to the first transceiver chip.

In certain aspects, the transmission operations and reception operations of the signals in the first frequency band are time-division duplexed (TDD). In certain aspects, the transmission operations and reception operations of the signals in the second frequency band are time-division duplexed (TDD).

In certain aspects, the operations 600 also include assigning the transmission operations and reception operations of the signals in the first frequency band to the first transceiver chip, and determining whether to use the second frequency band for communication. In this case, the transmission operations or the reception operations of the signal in the first frequency band may be assigned to the second transceiver chip in response to the determination. In certain aspects, the first frequency band corresponds to a primary component carrier (PCC), and the second frequency band corresponds to a secondary component carrier (SCC).

The techniques provided herein can be applied to overcome VCO pulling issues in any system with multiple transceiver chips, wherein at least one of the transceiver chips are in TDD mode. For example, in the communication system 400 of FIG. 4, the transceiver chip 402 may be in TDD mode, and the transceiver chip 404 may be in FDD mode. To overcome the VCO pulling issues of transceiver chip 402, the transmission operations or reception operations of the transceiver chip 402 may be dynamically assigned to transceiver chip 404, and vice versa, so long as the transmit and receive operations of each of the transceiver chips 402 and 404 operate in sufficiently spaced apart frequencies after the assignment.

In some cases, due to front-end limitations, or the number of CCs and transceiver chip limitations, it might not be possible to have a hopping combination such that all the transceiver chips have VCOs operating at different frequency. In this case, the carrier may be ranked in terms of their current throughput/grant contribution and the carrier with the highest throughout/grant contribution may be given the highest priority. For example, the hopping mechanism may be applied to address VCO pulling issues on one or more carriers having the highest throughput contribution.

While certain examples provided herein have described techniques for overcoming VCO pulling issues for carrier aggregation, the techniques described herein can be applied to other communication protocols. For example, in a dual subscriber identity module (SIM) system, one subscription may be used for data calls on a certain band/channel and another subscription from the same operator may be idle or in connected mode. The other subscription may be on the same channel as the subscription for data calls and both subscriptions may be implemented on the same chip, causing VCO pulling issues. In this scenario, the techniques proposed herein can be used to mitigate VCO pulling for the dual SIM system by hopping the subscription for the data calls (or the other subscription in idle or connected mode) to another transceiver chip.

The various operations or methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting may comprise a transmitter (e.g., the transceiver front end 254 of the user terminal 120 depicted in FIG. 2 or the transceiver front end 222 of the access point 110 shown in FIG. 2) and/or an antenna (e.g., the antennas 252ma through 252mu of the user terminal 120m portrayed in FIG. 2 or the antennas 224a through 224ap of the access point 110 illustrated in FIG. 2). Means for receiving may comprise a receiver (e.g., the transceiver front end 254 of the user terminal 120 depicted in FIG. 2 or the transceiver front end 222 of the access point 110 shown in FIG. 2) and/or an antenna (e.g., the antennas 252ma through 252mu of the user terminal 120m portrayed in FIG. 2 or the antennas 224a through 224ap of the access point 110 illustrated in FIG. 2). Means for processing, means for adjusting, means for assigning, means for dynamically assignment, or means for determining may comprise a processing system, which may include one or more processors, such as the RX data processor 270, the TX data processor 288, and/or the controller 280 of the user terminal 120 illustrated in FIG. 2. Means for generating an LO signal may comprise a voltage controlled oscillator (VCO).

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC with the processor, the bus interface, the user interface in the case of an access terminal), supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

Certain aspects of the present disclosure may comprise a computer-readable medium. The computer-readable medium may have instructions stored (and/or encoded) thereon, the instructions being executable by one or more processors to perform the operations described herein.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication, comprising:
a first transceiver configured to transmit and receive signals in a first frequency band;
a second transceiver configured to transmit and receive signals in a second frequency band; and
a processing system coupled to the first transceiver and the second transceiver and configured to dynamically assign transmission operations or reception operations of a signal in the first frequency band to the second transceiver,
wherein the processing system is configured to determine whether at least one of:
the transmission operations and reception operations of the signals in the first frequency band are time-division duplexed (TDD); or
transmission operations and reception operations of the signals in the second frequency band are time-division duplexed (TDD); and
the processing system is configured to dynamically assign the transmission operations or the reception operations of the signal in the first frequency band to the second transceiver based on the determination.

2. The apparatus of claim 1, wherein the processing system is configured to dynamically assign the transmission operations or the reception operations in the first frequency band to the second transceiver by adjusting a frequency of a voltage-controlled oscillator (VCO) used to upconvert another signal to generate the signal in the first frequency band for transmission or downconvert the signal in the first frequency band for reception, respectively.

3. The apparatus of claim 1, wherein the second transceiver comprises a first VCO and a second VCO, and wherein, after the transmission operations or the reception operations of the signal in the first frequency band are assigned to the second transceiver:
the first VCO is configured to provide a first local oscillator (LO) signal for:
upconverting another signal to generate the signal in the first frequency band for transmission; or
downconverting the signal in the first frequency band for reception; and
the second VCO is configured to provide a second LO signal for:
upconverting another signal to generate a signal in the second frequency band for transmission; or
downconverting the signal in the second frequency band for reception.

4. The apparatus of claim 1, wherein:
the processing system is configured to assign the transmission operations of the signal in the first frequency band to the second transceiver; and
the processing system is configured to assign transmission operations of a signal in the second frequency band to the first transceiver.

5. The apparatus of claim 1, further comprising:
a third transceiver coupled to the processing system and configured to transmit and receive signals in a third frequency band, wherein the processing system is configured to assign transmission operations or reception operations of a signal in the second frequency band to the third transceiver.

6. The apparatus of claim 5, wherein:
the processing system is configured to assign the transmission operations of the signal in the first frequency band to the second transceiver;
the processing system is configured to assign the transmission operations of the signal in the second frequency band to the third transceiver; and
the processing system is configured to assign transmission operations of a signal in the third frequency band to the first transceiver.

7. The apparatus of claim 1, wherein the transmission operations and reception operations of the signals in the first frequency band or the second frequency band are time-division duplexed (TDD).

8. The apparatus of claim 1, wherein the first transceiver and the second transceiver reside in separate chips.

9. The apparatus of claim 1, wherein the processing system is configured to:
assign the transmission operations and reception operations of the signals in the first frequency band to the first transceiver;
determine whether to use the second frequency band for communication; and
assign the transmission operations or the reception operations of the signal in the first frequency band to the second transceiver in response to the determination.

10. The apparatus of claim 1, wherein the first frequency band corresponds to a primary component carrier (PCC), and wherein the second frequency band corresponds to a secondary component carrier (SCC).

11. The apparatus of claim 1, wherein the first frequency band corresponds to a first subscription of a dual subscriber identify module (SIM) system, and the second frequency band corresponds to a second subscription of the dual SIM system.

12. The apparatus of claim 1, wherein signals in the first frequency band are carrier aggregated with signals in the second frequency band.

13. An apparatus for wireless communication of claim 1, comprising:
a first transceiver configured to transmit and receive signals in a first frequency band;
a second transceiver configured to transmit and receive signals in a second frequency band; and
a processing system coupled to the first transceiver and the second transceiver and configured to dynamically assign transmission operations or reception operations of a signal in the first frequency band to the second transceiver,
wherein the processing system is configured to:
rank a plurality of carriers of the first transceiver and the second transceiver based on current throughput of the carriers; and
dynamically assign the transmission operations or the reception operations of the signal in the first frequency band corresponding to one of the plurality of carriers to the second transceiver based on the ranking.

14. The apparatus of claim 13, wherein the processing system is configured to:
determine that the one of the plurality of carriers has the highest current throughput based on the ranking; and
dynamically assign the transmission operations or the reception operations of the signal in the first frequency band corresponding to the one of the plurality of carriers to the second transceiver in response to the determination.

15. The apparatus of claim 13, wherein:
the processing system is configured to determine that it is not possible to dynamically assign transmission operations or reception operations of signals in at least one of the first frequency band and the second frequency band such that each of the first transceiver and the second transceiver have VCOs operating in different frequencies; and
the ranking of the plurality of carriers is in response to the determination.

16. A method for wireless communication, comprising:
determining whether transmission operations and reception operations of a first transceiver chip are time-division duplexed (TDD), the first transceiver chip being configured to transmit and receive signals in a first frequency band; and
dynamically assigning the transmission operations or the reception operations of a signal in the first frequency band to a second transceiver chip based on the determination, the second transceiver chip being configured to transmit and receive signals in a second frequency band.

17. The method of claim 16, wherein dynamically assigning the transmission operations or the reception operations comprises adjusting a frequency of a voltage-controlled oscillator (VCO) used to upconvert another signal to generate the signal in the first frequency band for transmission or downconvert the signal in the first frequency band for reception, respectively.

18. The method of claim 16, wherein:
the second transceiver chip comprises a voltage-controlled oscillator (VCO); and
the method further comprises, after the transmission operations or the reception operations of the signal in the first frequency band are assigned to the second transceiver chip, configuring the VCO to provide a local oscillator (LO) signal for:
upconverting another signal to generate the signal in the first frequency band for transmission; or
downconverting the signal in the first frequency band for reception.

19. The method of claim 16, wherein the dynamically assigning comprises:
assigning the transmission operations of the signal in the first frequency band to the second transceiver chip; and
assigning transmission operations of a signal in the second frequency band to the first transceiver chip.

20. The method of claim 16, wherein the dynamically assigning comprises:
assigning transmission operations or reception operations of a signal in the second frequency band to a third transceiver chip.

21. The method of claim 20, wherein the dynamically assigning comprises:
assigning the transmission operations of the signal in the first frequency band to the second transceiver chip;
assigning the transmission operations of the signal in the second frequency band to the third transceiver chip; and
assigning transmission operations of a signal in a third frequency band to the first transceiver chip.

22. The method of claim 16, wherein the transmission operations and the reception operations of the signals in the first frequency band are time-division duplexed (TDD).

23. The method of claim 16, wherein transmission operations and reception operations of the signals in the second frequency band are time-division duplexed (TDD).

24. The method of claim 16, further comprising:
assigning the transmission operations and reception operations of the signals in the first frequency band to the first transceiver chip; and
determining whether to use the second frequency band for communication, wherein the transmission operations or the reception operations of the signal in the first frequency band are assigned to the second transceiver chip in response to the determination.

25. The method of claim 16, wherein the first frequency band corresponds to a primary component carrier (PCC), and wherein the second frequency band corresponds to a secondary component carrier (SCC).

26. An apparatus for wireless communication, comprising:
means for transmitting and receiving signals in a first frequency band;
means for transmitting and receiving signals in a second frequency band; and
means for dynamically assigning transmission operations or reception operations of a signal in the first frequency band to the means for transmitting and receiving signals in the second frequency band,
wherein the means for dynamically assigning comprises means for determining whether at least one of:
the transmission operations and reception operations of the signals in the first frequency band are time-division duplexed (TDD); or
transmission operations and reception operations of the signals in the second frequency band are time-division duplexed (TDD); and
the means for dynamically assigning comprises means for dynamically assigning the transmission operations or the reception operations of the signal in the first frequency band to the means for transmitting and receiving signals in the second frequency band based on the determination.

27. The apparatus of claim 26, wherein the means for dynamically assigning comprises means for adjusting a frequency of a means for generating an oscillating signal used to upconvert another signal to generate the signal in the first frequency band for transmission or downconvert the signal in the first frequency band for reception, respectively.

28. The apparatus of claim 26, wherein:
the means for transmitting and receiving signals in the second frequency band comprises a means for generating a first local oscillator (LO) signal and a means for generating a second LO signal; and
after the transmission operations or the reception operations of the signal in the first frequency band are assigned to the means for transmitting and receiving signals in the second frequency band:
the means for generating the first LO signal is configured to provide the first LO signal for:
upconverting a first signal to generate the signal in the first frequency band for transmission; or
downconverting the signal in the first frequency band for reception; and
the means for generating the second LO signal is configured to provide the second LO signal for:
upconverting a second signal to generate a signal in the second frequency band for transmission; or
downconverting the signal in the second frequency band for reception.

29. The apparatus of claim 26, wherein the means for dynamically assigning comprises:

means for assigning the transmission operations of the signal in the first frequency band to the means for transmitting and receiving signals in the second frequency band; and means for assigning transmission operations of a signal in the second frequency band to the means for transmitting and receiving signals in the first frequency band.

30. The apparatus of claim 26, further comprising:

means for transmitting and receiving signals in a third frequency band, wherein the means for dynamically assigning comprises means for assigning transmission operations or reception operations of a signal in the second frequency band to the means for transmitting and receiving signals in the third frequency band.

* * * * *